Patented July 10, 1934

1,966,238

UNITED STATES PATENT OFFICE 1,966,238

PAPER FOR CORRUGATING PURPOSES AND PROCESS OF FORMING THE SAME

Pierre Drewsen, Sandusky, Ohio, assignor to Hinde & Dauch Paper Company, Sandusky, Ohio, a corporation of Ohio No Drawing. Application April 19, 1933, Serial No. 666,932

10 Claims. (Cl. 92—13)

The invention relates to the manufacture of corrugating paper suitable for use in corrugated paper boxes and cartons, insulating and building boards and the like, where the stiffness of the corrugated element is essential for the maintenance of the integrity of the product. Among the objects of this invention are First, to utilize low cost materials obtainable close to the point of manufacture and consumption of the finished product;

Second, to convert this low cost material into corrugating paper by a simple and inexpensive method;

Third, to obtain a product which is in general superior to those produced by present processes.

Corrugating papers now in use are made principally from straw and wood, but in every instance such straw or wood requires a chemical cooking at temperatures more or less elevated above 212° F. In addition to the cooking, a washing operation is necessary to remove excess chemicals and spent liquors. Such cooking and washing results in a very substantial shrinkage in weight, for example to manufacture one ton of straw paper requires approximately three thousand net pounds or more of straw, after due deductions are made for excess moisture. However excellently straw paper may serve its purpose, there are serious disadvantages in its manufacture, among them the large inventory of raw materials required, the excess handling and danger of straw stack fires, and the large amount of labor required to process it. A further disadvantage is the great distance of straw paper mills and mills for making corrugating paper out of wood from the market for the finished product.

To overcome these disadvantages, I have devised a process for the manufacture of corrugating paper out of low cost materials such as mixed paper stock which is obtainable in the same centers of population in which corrugated paper products are largely distributed. Numerous attempts have been made to manufacture corrugating paper out of mixed paper stock (waste paper material such as corrugated boxes, old newspapers, office and household waste basket material, clippings and trimmings from paper converting machines) but all such attempts have failed for the reason that the paper produced (known as chip paper) lacked the necessary rigidity and stiffness which is demanded. This defect I have, however, overcome by my improved process which has the following essential characteristics, first, the mixed paper stock must be treated in a caustic solution; second, the fiber must be subjected to a more drastic mechanical attrition, but not too drastic; third, a portion of the causticity or at least of the alkalinity of the fiber must be allowed to remain in the finished product.

In practice, the caustic material such as sodium hydroxide or calcium hydroxide is added to the system together with the paper stock. The temperature of the water is maintained at ordinary operating conditions, that is, at room temperature. The disintegrated fiber is jordanned hard and no addition of alum or other acid substance (contrary to regular paper making practice) is made. In other words, the regular process of manufacturing chip paper is carried out with the exception that the water which carries the fibrous material to its ultimate destination is maintained in caustic condition, not merely alkaline, a more severe grinding of the fibers takes place in the refining engines and the caustic water is used in the vats of the paper machine with no attempt to neutralize the causticity of the fiber or the water. In fact, it is essential to the success of the process that the dry paper be reeled up at the end of the paper machine in an appreciably caustic condition, for if even a slight excess of alum is used, the stiffness of the paper disappears after a period of time and the character of the corrugating paper changes to that of chip paper which is not suitable for corrugating purposes.

Not over 2% of caustic soda or less is required for a furnish of mixed paper stock which contains only relatively small quantities of newspaper. This amount of caustic material brings about a causticity in the water of the machine chest of approximately one hundredth normal, that is to say about 0.40 grams NaOH per litre, or four pounds per ten thousand pounds of water. If, however, the furnish consists of more than 10% of old newspaper, it may be necessary to increase the caustic content. By using 4% caustic soda based on the weight of the fibrous material, I have found it possible to make corrugating paper out of a furnish of 100% of old newspapers, but the amount of grinding required makes the stock so finely subdivided that defects are encountered in practical operation. Generally speaking, a furnish of mixed paper stock is required with as little newspaper as is practical, although there will probably always be some newspaper present.

On the other hand, if the mixed paper stock is rich in corrugated clippings or kraft paper, the amount of caustic may be reduced somewhat for the reason that the stiffer the fiber is initially, the less this special processing is required, assuming of course that the corrugating paper being manufactured is required to meet certain standards of stiffness by actual control tests on the finished product. Indeed such product control is almost vital to the success of this process, for without it, the stiffness of the paper may diminish without giving any warning through changed appearance or in other respects.

I have found that caustic lime or calcium hydroxide may be used instead of caustic soda. This is more particularly true if the furnish contains appreciable quantities of silicate of soda, on which the lime hydrate appears to exert a causticizing action with the formation of sodium hydroxide. On the other hand, the presence of silicate of soda, as for example in waste from corrugated box plants or solid fiber plants, is not absolutely essential. Lime hydrate alone appears to be of sufficient potency to develop the stiffness required, although corrugating paper made from it has a harsher feel, which may or may not be disadvantageous, depending upon conditions under which it is corrugated.

With respect to temperature, I have found that it is possible to produce corrugating paper from mixed paper stock by a hot treatment in a paper mill beater or in a Werner and Pfleiderer mixer prior to the refiners, using either calcium or sodium hydroxide. However, there appears to be no advantage in the use of heat.

As previously stated, my improved product may be made by apparatus in general use, such for instance as single cylinder paper machines, multi-cylinder or Fourdriniers. Of the three types, the multi-cylinder machine is preferable, as this apparently produces the stiffest paper for a given intensity of processing, that is to say, for a given quantity of caustic and given mechanical attrician. On the other hand, not every multi-cylinder machine is adapted for making corrugating paper, for the reason that they are often designed for paper which is considerably heavier and therefore in order to operate economically they must run at a speed in excess of that for which they are designed. If a Fourdrinier or a single cylinder machine is used, it may be necessary to compensate for the lack of the laminated formation by the addition of one or more extra refining engines or a slightly increased causticity in the machine water.

Paper manufactured according to this improved process is from .006 to .013 of an inch in thickness, but generally .009 and of a weight from about 24 to 38 pounds per thousand square feet of area. It differs in two important respects, from present corrugating papers made from wood or straw, and in these respects is considerably superior. In the first place, the pliability is greater and the brittleness is less. Processes for cooking straw and wood for corrugating purposes depend upon the use of a minimum quantity of cooking chemicals in the pulp digesters, in order to keep the chemical costs low and to reduce the necessary washing of the fiber to a minimum. It is known that the application of higher temperatures to cellulosic material in the presence of water without adequate chemical protection is the cause of almost certain deterioration of the stock. Mixed paper stock on the contrary is composed of elements, the greater portion of which have either been cooked with a thorough excess of cooking chemicals, thereby assuring cellulosic protection, or else the fibers have been prepared by low temperature processes, such for instance as the mechanical grinding of wood or the use of other comparatively raw fibers, as for example, a rag paper. I attribute this property of improved flexibility and reduced brittleness of my corrugating paper to this fact, plus the conditions of low temperature which obtain in my process.

In the second place, both the bursting or Mullen strength and the tearing strength of this paper are greater than corresponding tests made on straw and wood corrugating papers. For example, the bursting strength of straw and certain wood papers falls well under thirty pounds Mullen, whereas a bursting strength of approximately seventy pounds is not uncommon with a mixed paper stock furnish treated as described above. The advantage of this is evident when it is realized that the present official standards for corrugated boxes require a minimum Mullen test for each type of box. Since the bursting strength of the wall of the box is the sum of the combined bursting strength of the two liners and the corrugated interior, it is evident that an increase in the strength of one will either contribute to the total combined strength or it will enable the manufacturer to reduce his furnish cost on the liner components and still stay within the required tolerance.

To illustrate the physical properties of my improved corrugating paper as compared with certain other papers, the following tests have been made. In each instance the corrugations of the paper are the so-called A flute which are about 0.175 inch high and are spaced about one-third of an inch apart. These are reported on a bone dry basis to eliminate the effect of moisture.

| Kind | Weight per 1,000 sq. ft. | Caliper inches | Crushing resistance bone dry basis |
|---|---|---|---|
| Chip | pounds 30 | .009 | 20 lbs. per sq. in. or less. |
| Straw corrugating | 30 | .009 | 30 to 35 lbs. per sq. in. |
| Wood corrugating | 30 | .009 | 30 to 35 lbs. per sq. in. |
| Improved paper from caustic treated mixed paper stock. | 30 | .009 | 40 to 50 lbs. per sq. in. |

While the above tests were all made on paper running 30 lbs. per thousand square feet, it is obvious that my improved product would have the same advantage if used in papers either of greater or lesser thicknesses. The crushing resistance would be substantially proportionate to thickness, and therefore the strength of my improved product might be generally expressed as having a crushing resistance in excess of one pound per square inch for each pound of weight per thousand square feet of the flat paper area.

What I claim as my invention is:

1. A paper suitable for the corrugated portion of fiber shipping containers composed of mixed paper stock such as used in the manufacture of the so-called chip paper and having in the manufactured product an alkaline reaction.

2. A paper suitable for the corrugated portion of fiber shipping containers being of a thickness between .006 and .013 of an inch composed of mixed paper stock such as used in the manufacture of the so-called chip paper and having in the manufactured product an alkaline reaction.

3. A paper suitable for the corrugated portion of fiber shipping containers composed of mixed paper stock such as used in the manufacture of the so-called chip paper having in the manufactured product an alkaline reaction and when corrugated having a crushing resistance in excess of thirty-five pounds per square inch for a weight basis of thirty pounds per thousand square feet of the flat paper area.

4. A paper suitable for the corrugated portions of fiber shipping containers composed of a mixed paper stock such as used in the manufacture of the so-called chip paper having in the manufactured product an alkaline reaction and when corrugated having a crushing resistance in excess of one pound per square inch for each pound of weight per thousand square feet of the flat paper area.

5. The process of forming paper suitable for the corrugated portion of fiber shipping containers comprising the treating of mixed paper stock such as used in the manufacture of the so-called chip paper with dilute caustic alkali, and maintaining a caustic condition throughout the paper making process.

6. In a process of manufacturing paper for corrugating purposes from waste paper materials, the steps of treating the material in the presence of cold caustic alkali solution and maintaining the caustic condition throughout the paper making process.

7. In a process of manufacturing paper for corrugating purposes from mixed paper stock such as used in the manufacture of the so-called chip paper, the steps of disintegrating the stock in a cold aqueous solution of alkali hydroxide of not over 4% based on the weight of fibrous material and in maintaining a portion of the causticity throughout the paper making process.

8. In a process of manufacturing paper for corrugating purposes from mixed paper stock such as used in the manufacture of the so-called chip paper, the steps of mechanically disintegrating the stock in the presence of cold dilute caustic alkali solution of not over 4% of caustic based on the weight of the fiber, and in maintaining a portion of the causticity throughout the paper making process.

9. A paper suitable for the corrugated portion of fiber shipping containers composed of mixed paper stock such as used in the manufacture of the so-called chip paper and being in the manufactured product free from acid reaction.

10. A paper suitable for the corrugated portion of fiber shipping containers composed of mixed paper stock such as used in the manufacture of the so-called chip paper and which has been subjected to a caustic treatment throughout its entire manufacturing process, the final product having an alkaline reaction.

PIERRE DREWSEN.